Apr. 17, 1923.
G. A. SCHACHT
1,452,220
TRANSMISSION MECHANISM
Filed Dec. 22, 1919
2 Sheets-Sheet 1
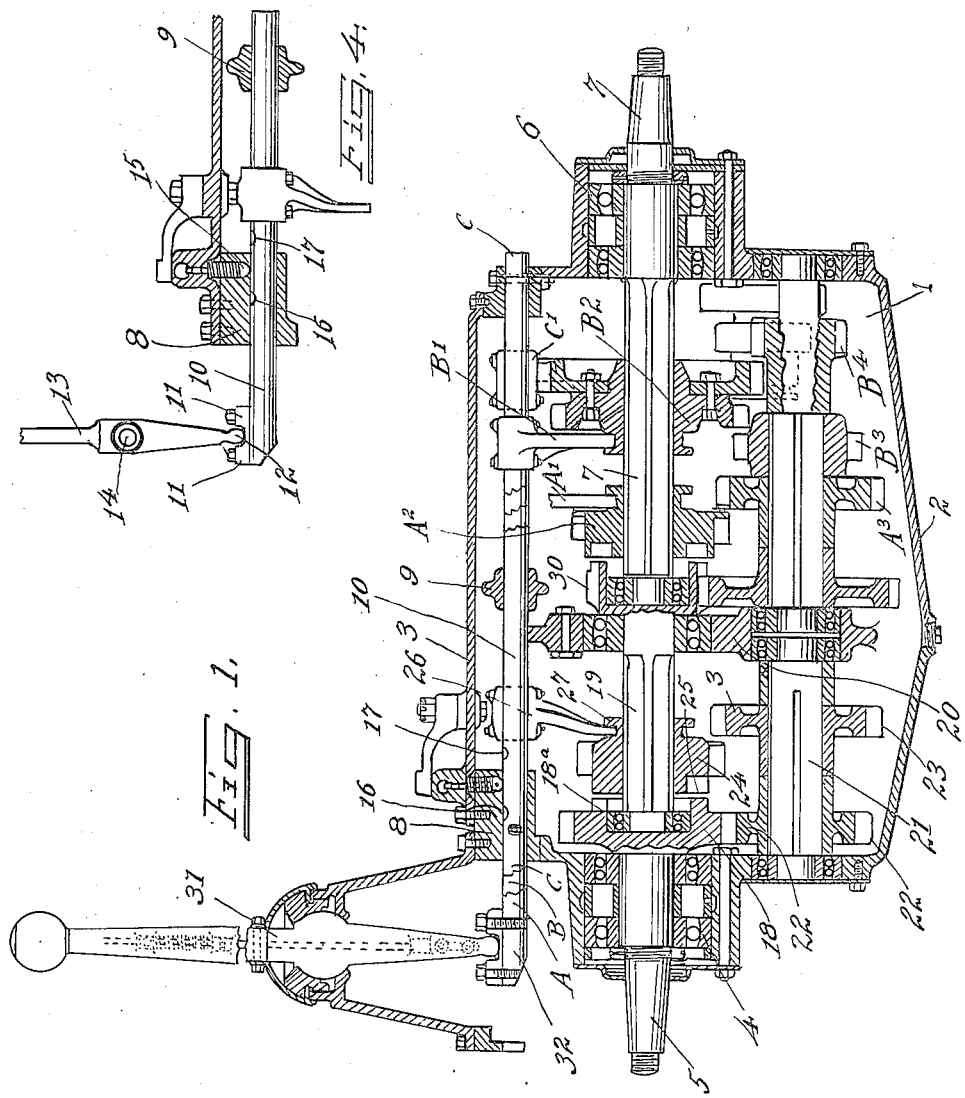
Inventor:
Gustave A. Schacht
By Albert Allen
Attorneys.

Apr. 17, 1923.
G. A. SCHACHT
1,452,220
TRANSMISSION MECHANISM
Filed Dec. 22, 1919
2 Sheets-Sheet 2
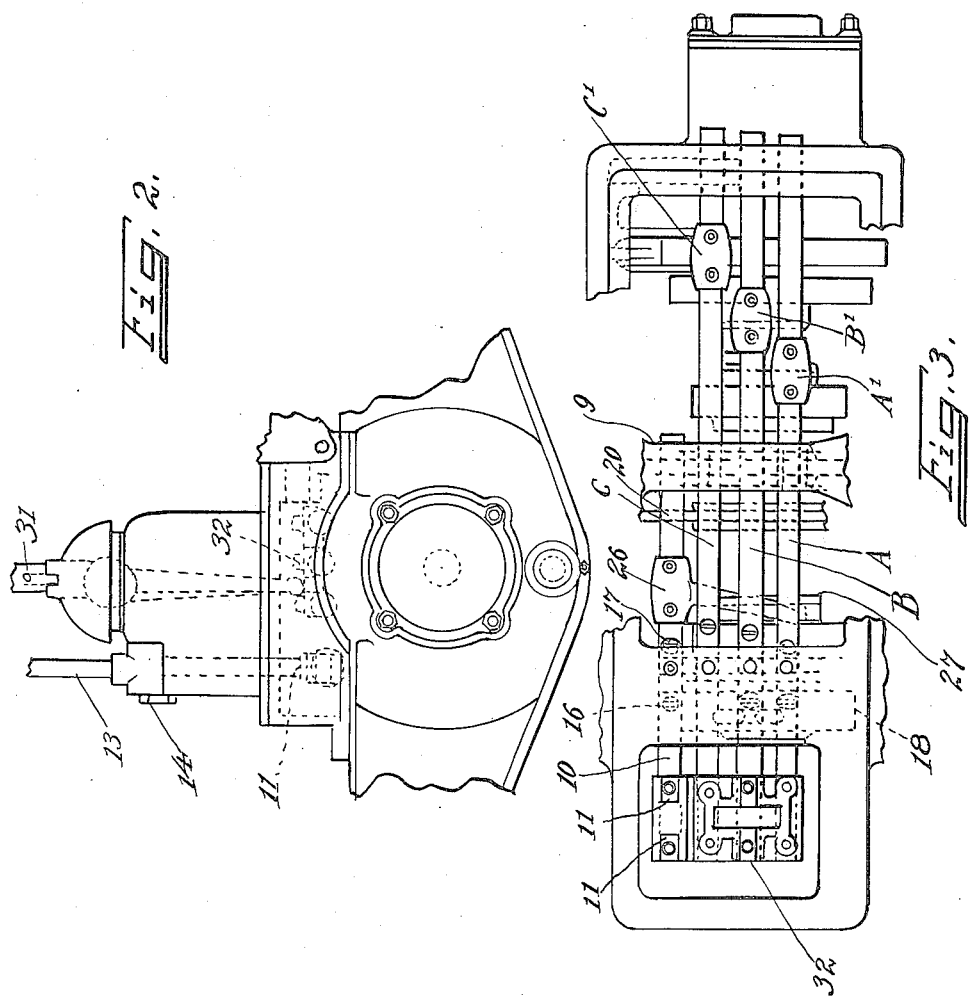
Inventor:
Gustave A Schacht
By Allen & Allen
Attorneys.

Patented Apr. 17, 1923.

1,452,220

UNITED STATES PATENT OFFICE.

GUSTAVE A. SCHACHT, OF PLAINVILLE, OHIO.

TRANSMISSION MECHANISM.

Application filed December 22, 1919. Serial No. 346,468.

*To all whom it may concern:*

Be it known that I, GUSTAVE A. SCHACHT, a citizen of the United States, and a resident of Plainville, in the county of Hamilton and State of Ohio, have invented certain new and useful Improvements in Transmission Mechanisms, of which the following is a full, clear, and accurate description, reference being had to the drawings forming a part of this specification.

My invention relates to change of speed mechanisms particularly for use with motor vehicles, and more especially with commercial motor vehicles.

One of the defects in commercial motor vehicles, due to their excessive weight, and the variable nature of the loads transported in them, is the excessive speed at which the motor must be run, when the vehicles are running light, or running on a level grade with a load.

In order to enable a motor of convenient size to operate a vehicle carrying a heavy load, said vehicle being quite heavy itself in addition, it is necessary to provide a large gear reduction intermediate the motor and the driving axle or axles. It is also necessary to provide for change of speed gearing which will permit of various speeds of rotation of the driving shaft of the vehicle.

In the instance of say a fourteen-to-one gear reduction intermediate the motor and the rear axle of a truck, which is a usual one, in heavy vehicles of large capacity, it is readily apparent that to provide for good speed of the vehicle when running empty or along a level or slightly downward grade, the motor must be raced. This racing not only wears out the motor, but in addition is a large waste of fuel.

It is the object of my invention to provide in addition to the normal change of speed mechanism, and gear reduction, for a gear mechanism which provides for two ranges of speeds from the motor to the change of speed mechanism, one speed for light or level running, and another for hauling and grade climbing.

This object and other advantages to be noted I accomplish by that certain construction and arrangement of parts to be hereinafter more specifically pointed out and claimed.

In the drawings,

Figure 1 is a section taken vertically through a gear box, equipped with the device of my invention.

Figure 2 is an end elevation of the casing of such a gear box showing the operating levers.

Figure 3 is a top plan view of the gear box and shift levers, with the cover removed therefrom.

Figure 4 is a detail elevation of the operating devices for my new change of speed device.

It has not been considered necessary to show the parts of a motor vehicle, or to show in any great detail the usual gear shifting devices of the normal change of speed mechanism. The device of my invention operating in combination with the normal change of speed devices, may be, and preferably is, mounted in the same box with them.

Thus there is a gear box having sides 1, a base 2 and a top or lid 3. A roller bearing journal 4 at the forward end of the box receives the direct motor driven shaft 5, and a like bearing 6, at the rear end of the box receives the "driving" shaft 7 of the vehicle.

Inasmuch as my invention involves the intersetting of an additional shaft preferably between the normal change of speed mechanism and the motor shaft I will first describe the additional device, and then briefly describe the normal mechanism.

Mounted to slide in the front mounting bar 8 of the gear box and an intermediate mounting bar 9 across the central upper portion of the said box, is a sliding bar 10. This bar has nobs 11, 11, thereon, between which plays the foot 12 of a special shifting lever 13.

The special lever 13 is mounted within reach of the vehicle driver in the usual manner, by means of a pivot 14, and preferably lies along side of the normal change of speed shift lever. Its operation moves the sliding bar 10 into one of two positions, as indicated to the operator by means of a spring ball or plunger 15 mounted in the front mounting bar of the box, said ball bearing in the notches 16, 17, in the bar.

As will be noted it is not desirable that there be any neutral position for the sliding bar 10, but that it be left in either its forward or rearward position at all times. I do not find it necessary to absolutely enforce said two positions, however, and accordingly give leeway for a neutral position and merely guide the operator to a correct method of operation by means of a "click," as above noted.

Within the forward end of the gear box the motor or engine shaft is equipped with the gear 18, having a facial clutch element $18^a$. An additional shaft 19 is journaled at one end in this gear 18 and at the other in a partition 20 through the center of the gear box.

Below the shaft 19 in the forward end of the gear box is a shaft 21 carrying a fixed gear 22 in mesh constantly with the gear 18, and another gear 23. According to my preferred practise, but dependent upon the amount of the gear ratio that is constant between the motor and the driving axle or axles of the vehicle, I provide that the gear 18 shall be of many more teeth than the gear 22, thereby insuring a greater speed of revolution to the shaft 21, than to the motor shaft 5.

On the shaft 19 is a splined sliding gear 24, which has a facial clutch member 25 to mesh with the facial clutch on the gear 18, when in forward position. This gear will also mesh with the gear 23 on the lower or high speed shaft when moving rearwardly.

On the sliding bar 10 is an arm 26, which engages a grooved end 27 of the gear 24, and thus accomplishes a movement of said gear, the two positions of the sliding bar being such as to leave the gear 22 in mesh either with the facial clutch on the gear 18 or with the peripheral teeth on the gear 23.

The parts above described, therefore, result in the shaft 19 rotating either at the same speed or a different speed from the direct motor driven shaft. As will be seen, one of these speeds will be for light running or level grade running of the vehicle, and the other for normal hauling or hill climbing.

The normal change of speed mechanism comprises the driving shaft of the vehicle, which is supported at its forward end in a gear 30 on the end of the shaft 19, said gear having facial and peripheral teeth. The shaft has the splined facial and peripheral gear $A^2$ thereon which moves forward for direct drive from the shaft 19, and rearward for the second speed.

The normal shift mechanism shown in the drawings has four speeds forward and one reverse, and since they embody no changes from well known gear change mechanisms, there will be no detailed description of them. There are thus three slide bars, the bar A for direct and second speed, the bar B for third and fourth speed and the bar C for reverse. The bars have arms $A^1$, $B^1$, and $C^1$, which operate the splined gears $A^2$, $B^2$ and the reversing mechanism.

The gear $A^2$ in its rearward position meshes with gear $A^3$ for second speed. The gear $B^2$, in its forward position meshes with the gear $B^3$ for third speed and in its rearward position with the gear $B^4$, for fourth speed. The reversing mechanism is not shown in sufficient detail for reference, nor is it believed to be necessary.

The normal speed change is actuated by a universally mounted lever 31, whose end works in the lugged ends 32 of the sliding bars A, B and C. All of the bars slide in the front cross bar of the gear box, and the bars A, B and C slide also in the rear cross bar 32 thereof.

From the above the essential feature to be considered is the fact that the entire change of speed mechanism is unchanged from that usually employed in motor vehicles, and that an additional device is provided for interposing a high speed shaft between the motor and this normal mechanism, or between the normal mechanism and the differential.

When the truck is equipped with a small gear reduction on direct drive from the motor to the rear axle, then the relation of the shafts 5 and 21 will be such that the shaft 21 turns more slowly than the shaft 5. On the other hand, as will preferably be the case, when the gear reduction is large on direct drive, the shaft 21 will revolve more rapidly than the shaft 5.

It is preferred that the gear ratio of the additional mechanism be different than that of any of the normal speed changes which will provide for an intermediate speed between each of the normal speeds. As an illustration the normal changes could be 2 to 1 for second speed, $3\frac{1}{2}$ to 1 for third speed, 5 to 1 for fourth, and 6 to 1 for reverse, while the additional mechanism would be $1\frac{1}{2}$ to 1.

If a truck equipped with the additional gear reduction mechanism is running without a load, the driver can save his motor, and fuel by merely shifting the additional lever to high speed position, whereupon he will in no way be limited in utilizing the normal gear changes for climbing hills, stopping in traffic and the like.

Also when carrying a load, and coming to a clear stretch of level or down grade, where he cannot coast, the driver may temporarily shift to his high speed position, without losing his full control over the normal gear changing mechanism and again save his motor and fuel.

It is not desired to limit my invention to the specific construction and arrangement of parts because of my failure above to describe all the obvious mechanical equivalents of my invention or to limit the application of the features of my invention to motor vehicles alone.

Having thus described my invention, what I claim as new and desire to secure by Letters Patent is:—

In a motor vehicle, the combination of a gear case, a driving shaft at one end thereof, a driven shaft at the other, an internal shaft located within the casing in line with the driving and driven shafts, clutch devices on the driven and internal shafts adapted to be shifted to connect the two shafts in line for direct drive, a jack shaft in the case located alongside of the driven shaft, and driven by the internal shaft, said jack shaft having gears thereon, and sliding gears on the driven shaft to mesh with said gears to provide a second and third speed for the driven shaft, a lever connected to operate said clutch devices and the sliding gears on the driven shaft by movement to a plurality of positions, a jack shaft alongside the internal shaft, and driven by gearing from the driving shaft, and a clutch device located between the driving shaft and the internal shaft, and normally in position to connect them in line for direct drive, and an independent lever for shifting out said clutch device, and a gear portion on said clutch device adapted when said independent lever is shifted to mesh said internal shaft with the jack shaft last mentioned, whereby the lever first mentioned may be employed for all normal driving changes, without modification over the usual gear shift, and the additional lever may be shifted to impart a geared drive to the internal shaft, with the functions of the main lever being not otherwise interfered with.

GUSTAVE A. SCHACHT.